United States Patent [19]
DeVries

[11] Patent Number: 5,109,657
[45] Date of Patent: May 5, 1992

[54] RECEIVING SYSTEM FOR A BERRY HARVESTER

[76] Inventor: Jeffrey S. DeVries, 13530 Tyler St., Holland, Mich. 49424

[21] Appl. No.: 698,279

[22] Filed: May 10, 1991

[51] Int. Cl.$^5$ ............................................. A01D 46/26
[52] U.S. Cl. ...................................................... 56/330
[58] Field of Search ..................... 56/328.1, 330, 331

[56] References Cited

U.S. PATENT DOCUMENTS

| | | | |
|---|---|---|---|
| 3,184,908 | 5/1965 | Rust | 56/330 |
| 3,344,591 | 10/1967 | Christie et al. | 56/330 |
| 3,439,482 | 4/1969 | Orton | 56/330 |
| 4,441,305 | 4/1984 | Lippl | 56/228 X |
| 4,972,662 | 11/1990 | Korthuis et al. | 56/330 X |
| 4,977,736 | 12/1990 | Price, Jr. | 56/330 |

FOREIGN PATENT DOCUMENTS 2371133  7/1978  France .

Primary Examiner—Thuy M. Bui
Attorney, Agent, or Firm—Waters & Morse

[57] ABSTRACT

A berry-harvesting machine with opposite sets of overlapped pivoted plates forming receiving surfaces inclined from the center downward toward the sides of the machine is equipped with a plate construction that permits the plates of each set to lie flat against each other without significant intervening space. Accidental accumulations of fruit between the plates is thus avoided, as each swing of the plates caused by engagement with the bushes sweeps the adjacent plates clear, and moves undamaged fruit down the incline onto the collecting conveyors at the opposite sides of the machine.

6 Claims, 3 Drawing Sheets

RECEIVING SYSTEM FOR A BERRY HARVESTER

BACKGROUND OF THE INVENTION

Harvesting fruit grown on bushes has emerged from hand-picking in commercial operations, and now centers in machines that straddle the bushes and shake the fruit loose. Blueberries are commonly picked this way. The machines usually have some form of receiving system that deflects the fruit laterally from its point of contact as it falls, over to collecting conveyors on the opposite sides of the machines. These conveyors extend in the direction of movement on the machine, and deposit the fruit in receptacles. A machine of this type is described in my application Ser. No. 378,373, now U.S. Pat. No. 4,970,850. The present invention provides an improved receiving system over that shown in that patent and others I am familiar with.

The standard receiving system involves two sets of pivoted overlapped plates, one on each side of the machine, that are inclined upwardly toward the center. The plates of each set lie one on top of the other like a spread deck of cards. They pivot rearwardly on encountering the lower portion of a bush. As the bush passes through the machine, the plates swing back to again extend upwardly toward the center, usually with a slight sweepback to minimize contacting forces. These plates have usually been molded of plastic material in a configuration providing stiffening ribs that increase the effective thickness of the plates, and establish spaces between the plates where they overlap. These have proven to be inviting places for the accumulation of pieces of fruit, which tend to interfere with plate movement. The present invention provides a plate construction that is free of these tendencies, and causes each plate to sweep the next succeeding plate clear as the swinging action proceeds.

SUMMARY OF THE INVENTION

The overlapped inclined and pivoted plates forming the receiving surface provided by this invention for a berry-harvesting machine are constructed so that they lie substantially flat against each other so that no significant space is present between them to entrap the fruit. The yielding pivoting of the plates as they encounter the lower part of the bushes has the effect of sweeping the plates clear as the machine proceeds. The fruit is thus urged down the inclines into the collecting conveyors without damage.

DESCRIPTION OF THE DRAWINGS

FIG. 1 is a frontal perspective view of a harvesting machine, shown separated from the tractor it is usually associated with.

FIG. 4 is on an enlarged scale.

DESCRIPTION OF THE PREFERRED EMBODIMENTS

Figure 1:
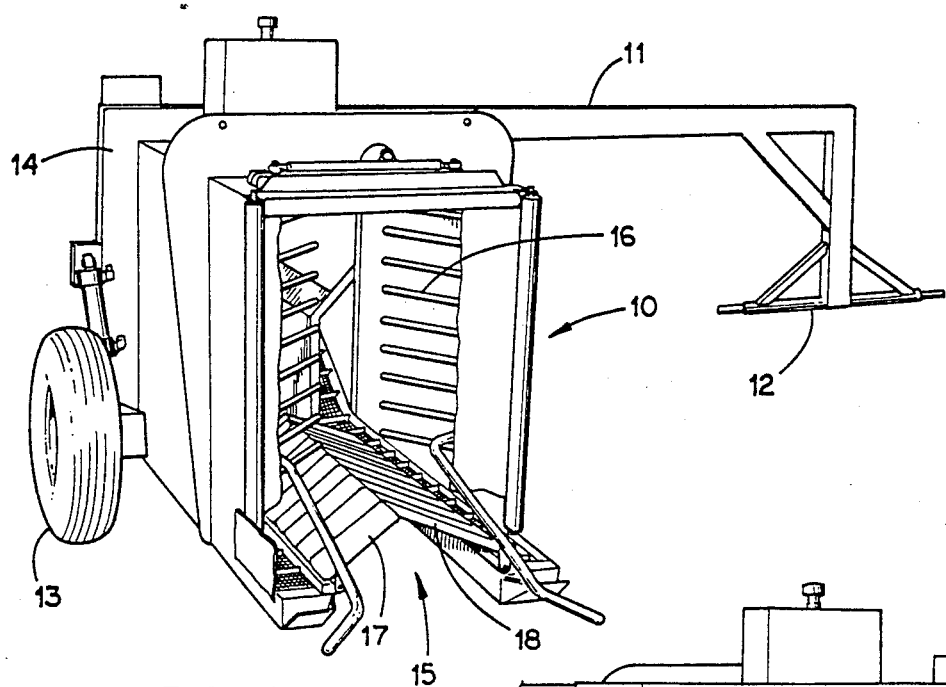
Figure 2:
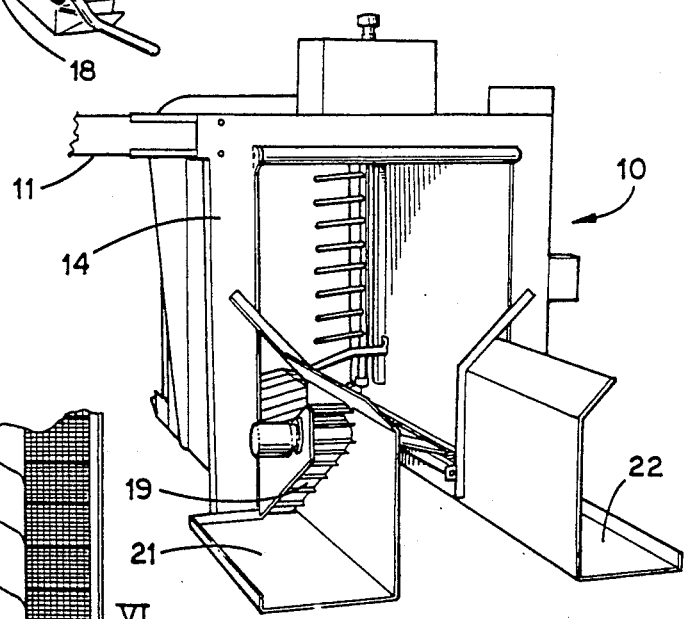
FIG. 2 is a rear perspective view of the harvester shown in FIG. 1.
Figure 3:
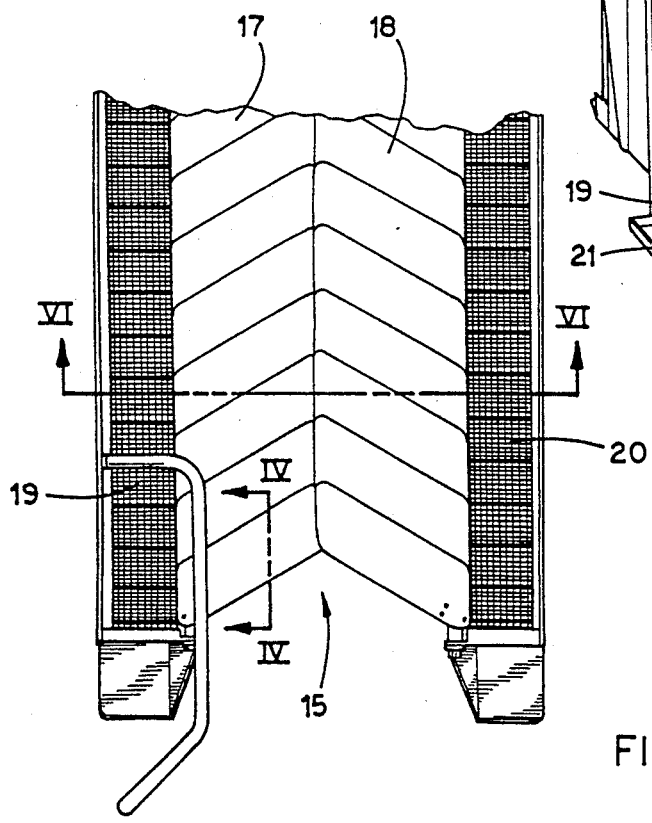
FIG. 3 is a plan view showing the receiving system of the harvester.

Referring to FIGS. 1-3, the harvesting machine generally indicated at 10 is attached by the boom 11 to a tractor through the engagement of the hitch-receiving structure indicated at 12. The machine thus has the appearance in operation of the side car on a motorcycle, with most of the weight of the machine being supported on the wheel 13. A U-shaped frame 14 permits the machine to straddle the bushes which move into the gap 15 as the machine proceeds along a row. A beating mechanism 16 shakes the bushes violently enough to dislodge the berries, which fall downward onto the receiving system formed by the opposite sets of inclined plates shown at 17 and 18. These receiving surfaces cause the fruit to roll to the sides, where they are deposited in the collecting conveyors 19 and 20. These convey the fruit to the rear, where they are deposited in containers placed upon the platforms 21 and 22. The structure described to this point is illustrated in my application Ser. No. 378,373.

Figure 4:
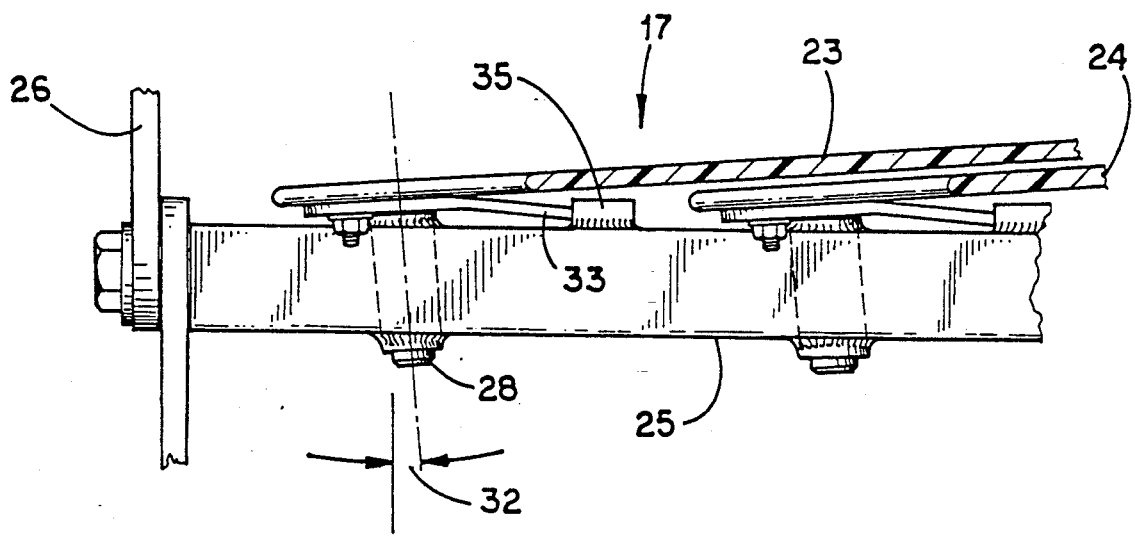
FIG. 4 is a sectional elevation on an enlarged scale, taken on the plane IV—IV of FIG. 3, without the inclusion of the collecting conveyors.
Figure 5:
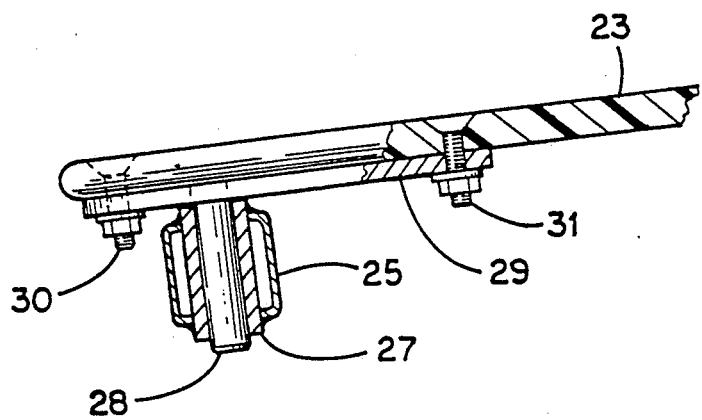
FIG. 5 is a sectional elevation showing the pivot mounting of the receiving plates.
Figure 6:
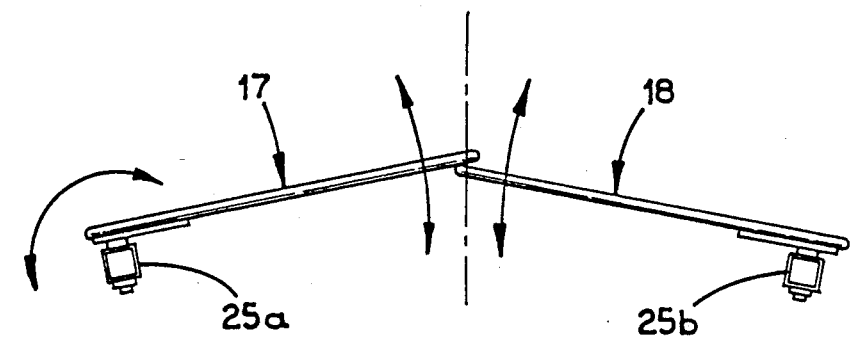
FIG. 6 is a schematic view shown from the front, illustrating the inclination of the receiving plates, and the range of adjustability.
Figure 7:
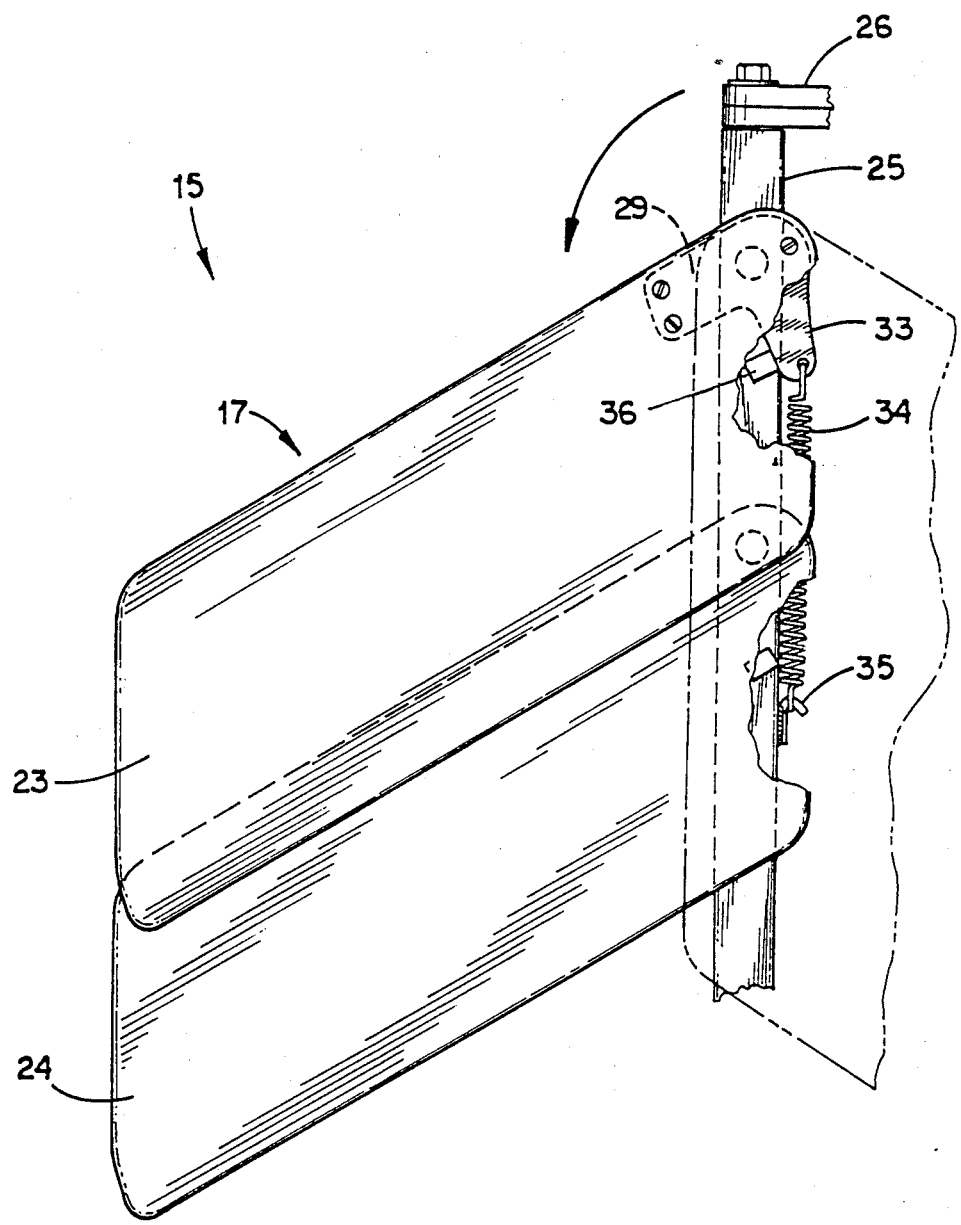
FIG. 7 is a perspective view of the receiving plates, showing the biasing system.

The structure of the pivoted plates forming the inclined receiving surfaces 17 and 18 is best illustrated in FIGS. 4, 5, and 7. The individual plate assemblies have the configuration best shown in FIG. 7, in which the body portions 23 and 24 are shown to overlap. The machine may be considered as moving along a row of bushes that enter into the gap 15 in the direction of the arrow. Plates in front overlap the plates immediately to the rear. The plate assemblies are all pivotally mounted on beams as shown at 25, which are carried by brackets 26 that may be considered as part of the frame of the machine. The beams 25 are preferably square sections of steel tube, and are themselves adjustable about the axis of the tube to vary the inclination of the plate assemblies as seen in the front view appearing in FIG. 6. The bearings forming the pivotal mounting for the plate assemblies are shown best in FIG. 5. Short sections of steel tube 27 are welded to the beams 25, and are installed at an angle of approximately five degrees (5°) to the vertical, as seen in the side elevation appearing in FIG. 4. The short shafts 28 are welded to the flange plates 29 to form a journal member, and are freely rotatable in the bearings 27. The flange plates 29 are bolted as shown at 30 and 31 in FIG. 5 to the body portions, preferably with flat-head bolts to minimize any projection above the top surface of the receiving plates. The angle of five degrees (5°) shown at 32 in FIG. 4 is selected to establish that the plates are inclined just enough to swing over the succeeding plates without positive interference. FIG. 4 illustrates what may be referred as to the "nominal" inclined relationship, the axial freedom of the shafts 28 within the bearings 27 permits the plates to drop down onto the surface of the succeeding plates in parallel contact in an actual installation. If desired, the shafts may be held in the bearings by snap-ring retainers. In other words, each plate is tilted (proceeding from front to rear) just enough so that it will clear the height of the succeeding plate, along with its pivotal mounting. Each of the flange plates has an arm shown at 33 in FIG. 7 to which a spring 34 is connected. The opposite end of these springs is secured to a terminal as shown at 35 welded to the beam 25. A stop block 36 for each of the plates is also welded to the beam 25, and limits the position of the receiving plate assemblies under the action of the springs 34. Because of the five degree (5°) incline indicated at 32, it is preferable that the arms 33 have a slight downward kink as shown in FIG. 4 to minimize interference with the adjacent plate assembly, and permit the stop blocks 36 to function at a lower level.

Figure 8:
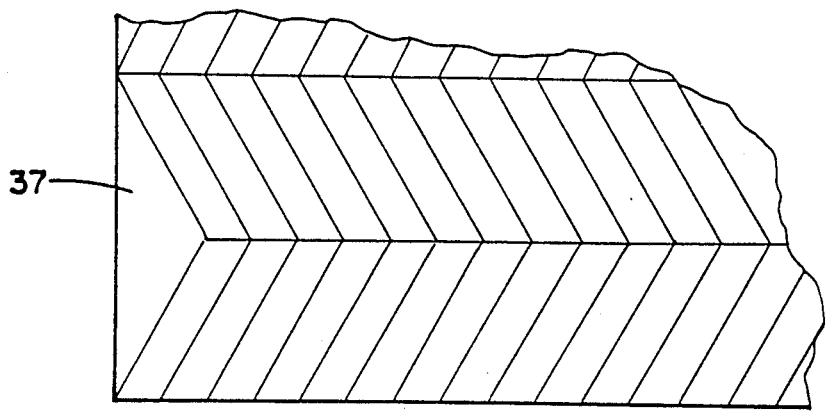
FIG. 8 is a diagrammatic layout showing how the plates are cut from a sheet of material.

The manufacture of the body portions of the receiving plates is best indicated in FIG. 8. A standard four foot (4') by eight foot (8') panel of polyvinyl chloride ("PVC") is laid out with cutting lines as shown. The cut plates are then rounded slightly at the corners and edges, and drilled to receive the fastenings securing the body portions of the receiving plates to the flange plates 29. Preferably, the plastic material of the receiving plates is between 3/16ths and ¼th of an inch in thickness. In most installations, the plates will be approximately fourteen inches (14") long along the longest diagonal, with the parallel end being one foot (1') apart to be formed economically from four foot (4') by eight foot (8') panels. The receiving plates should be about six inches (6") wide. The sweepback of the plates is best accommodated by a parallelogram configuration as shown. To obtain the necessary rigidity of the pivotal mounting, it is preferable that the flange plates 29 be of sheet steel about 3/16ths of an inch in thickness, with the journal shafts 28 being of steel rod of about ⅜ths of an inch in diameter.

I claim:

1. In combination with a berry-harvesting machine having an inverted U-shaped frame and a beating mechanism mounted within said frame, a fruit-receiving system having similar opposite sections mounted at the lower extremities of said frame, respectively, said sections each including a beam extending in a front-rear direction and secured to said frame, and also including a plurality of overlapped plate assemblies pivotally mounted on said beam and biased toward a position extending laterally from said beam, said sections providing inclined receiving surfaces having a central peak at a position where said plates of one of said sections approach said plates of the other of said sections, wherein the improvement comprises:

a construction of said plate assemblies including a flat body portion providing one of said receiving surfaces and having a uniform thickness, and also including a journal member having a plate forming an extended flange secured to the underside of said body portion, and a journal shaft secured to said flange plate, said beam having bearing means adapted to receive said journal shafts, said bearing means being disposed at an angle to said beam causing said body portions to overlap in a relationship at least approaching parallel contact between the underside of one of said body portions and the top of the next following body portion.

2. A combination as defined in claim 1, wherein said body portions have a peripheral configuration of a parallelogram other than a rectangle.

3. A combination as defined in claim 2, wherein said body portions are normally disposed at an angle of sweepback with respect to said beam.

4. A combination as defined in claim 3, wherein said body portions are constructed of polyvinyl chloride.

5. A combination as defined in claim 3, wherein said flange plate has an arm normally extending along said beam, said arm having means connecting the outer extremity of said arm to one end of a tension spring having the opposite end of said tension spring secured to said beam.

6. A combination as defined in claim 5, additionally including stop means on said beam establishing the normal position of said plate assembly against the action of said tension spring.

* * * * *